US006568255B2

United States Patent
Pallozzi

(10) Patent No.: US 6,568,255 B2
(45) Date of Patent: May 27, 2003

(54) UNIVERSAL THERMAL ENGINE SIMULATOR

(75) Inventor: Steven Pallozzi, Clarkston, MI (US)

(73) Assignee: ACT Laboratories, Inc., Hillsdale, MI (US)

(*) Notice: Subject to any disclaimer, the term of this patent is extended or adjusted under 35 U.S.C. 154(b) by 74 days.

(21) Appl. No.: 09/862,666

(22) Filed: May 21, 2001

(65) Prior Publication Data

US 2002/0170344 A1 Nov. 21, 2002

(51) Int. Cl.⁷ .............................................. G01M 15/00
(52) U.S. Cl. ........................................ 73/116; 73/117.1
(58) Field of Search ............................... 73/116, 117.1, 73/117.2, 117.3, 118.1, 118.2, 23.31

(56) References Cited

U.S. PATENT DOCUMENTS

| | | |
|---|---|---|
| 4,370,884 A | 2/1983 | Woss et al. |
| 4,848,717 A | 7/1989 | Bevill |
| 5,014,549 A | 5/1991 | Morley, II et al. |
| 5,355,713 A * | 10/1994 | Scourtes et al. .............. 73/116 |
| 5,417,109 A | 5/1995 | Scourtes |
| 5,492,006 A | 2/1996 | Beckett |
| 5,585,549 A * | 12/1996 | Brevick et al. ............ 73/117.1 |
| 5,705,742 A | 1/1998 | Fox et al. |
| 5,744,705 A | 4/1998 | Derouen et al. |
| 5,851,007 A | 12/1998 | Swartzlander et al. |
| 5,932,801 A | 8/1999 | Akishita et al. |
| 5,954,784 A | 9/1999 | Inada et al. |
| 5,978,727 A | 11/1999 | Jones et al. |
| 5,991,685 A | 11/1999 | Fukuchi et al. |
| 6,002,980 A | 12/1999 | Taylor et al. |
| 6,253,600 B1 * | 7/2001 | Sondey ........................ 269/17 |

* cited by examiner

Primary Examiner—Eric S. McCall
(74) Attorney, Agent, or Firm—Harness, Dickey & Pierce, PLC

(57) ABSTRACT

A test stand for testing an exhaust system for a vehicle is disclosed. The test stand has a engine block having a number of cylinders. The engine block is an engine head which defines exhaust ports to couple the engine block cylinders to the exhaust system. The engine cylinder has a coupled input plenum which is coupled to the lower access port. Each input plenum has a separate burner assembly which is coupled to a fuel source. Disposed between the fuel source and the burner assembly is a valve set which is capable of adjusting the amount of fuel inserted into the input plenums. A controller is provided which adjusts the amount of fuel into the input plenums.

12 Claims, 3 Drawing Sheets

UNIVERSAL THERMAL ENGINE SIMULATOR

BACKGROUND OF THE INVENTION

This invention relates to an operational testing device for exhaust systems, and more particularly to an apparatus for testing an exhaust system of an internal combustion engine. The test setup has multiple heater inputs, as well as a system for controlling the thermal and fluid loading throughout an engine block.

DESCRIPTION OF THE PRIOR ART

Devices for testing the thermal integrity of exhaust systems under varying thermal loading are known in the automotive industry. Often, these systems use a standard internal combustion engine dynamometer coupled to the exhaust system to provide heat and fluid flow. While dynamometers provide realistic vibration and heat flows through the engine exhaust system, these systems are often complicated to set up as well as expensive to run over long periods of time.

A second simpler static system utilizes a standard engine block disposed on a frame for providing heat to the exhaust system. These static systems use a single gas input to a set of burners for providing heat and gas flow into the cylinders of an automotive engine block. They typically have a single valve for regulating the gas into a plurality of burners disposed within the cylinders of an engine. Unfortunately, as gas flow through these cylinders often is different, the heating of individual cylinders frequently varies, leading to the thermo-gradients throughout the engine block. This can lead to improper test simulations and premature failure of the tested components and test hardware. It has also been found that the static simulators may not properly simulate fluid flow through the exhaust system.

SUMMARY OF THE INVENTION

It is an object of the present invention to provide a testing device for the exhaust system for an internal combustion engine, is simple, yet improved. The system offers many of the advantages of controlling the amount of heat and fluid flow into a particular cylinder of a test engine.

In general, the test device has an engine block that defines a number of cylinders having an access port through the bottom of the engine block. Coupled to each cylinder access port is an input plenum having a burner assembly disposed therein. The burner assembly is operatively coupled to a gas or fluid fuel source which effects the amount of gas and, hence, the temperature of a given engine cylinder. A valve set is disposed between the fluid source and a burner assembly for regulating the amount of gas to each individual burner. A controller is provided for adjusting the amount of fuel through the valve set based upon signals provided by a set of thermal couples distributed throughout the engine block. Coupled above the cylinders of the engine block is an altered engine head. The altered engine head provides a mechanism by which the exhaust system to be tested is coupled to the test stand.

In an alternate embodiment of the present invention, a system for pulsating the fluid flow through the engine block cylinders into the exhaust system is provided. A plurality of paddles are disposed within the combustion gas stream to regulate the amount of fluid flow from the engine block to the exhaust system.

Generally, the exhaust system to be tested has an exhaust manifold that is coupled to the exhaust ports of the engine block's head. Typically connected to the exhaust manifold is tubing, a catalytic converter and a muffler. The testing is conducted on the exhaust system to ensure that the systems meet the durability requirements of the automotive original equipment manufacturers.

BRIEF DESCRIPTION OF THE DRAWINGS

The present invention is hereinafter more specifically described with reference to the embodiment depicted in the accompanying drawings, wherein.

DESCRIPTION OF THE PREFERRED EMBODIMENT

Figure 1:
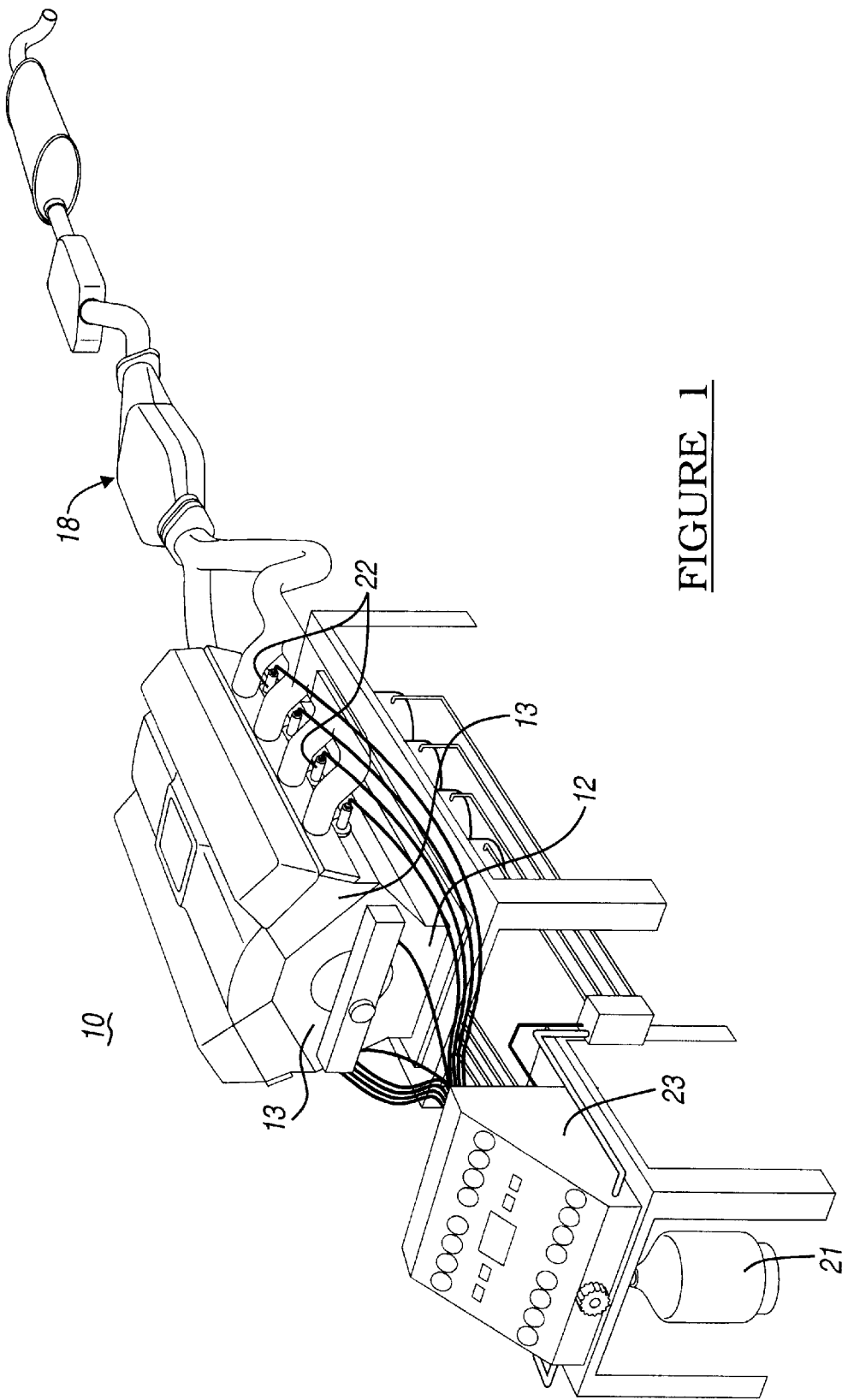
FIG. 1 discloses a perspective view of the exhaust system test stand of the current invention, coupled to a vehicle exhaust system.

FIG. 1 shows a perspective view of the exhaust system test stand 10 of the current invention. The exhaust test stand 10 has a standard engine block 12 being of the four, six, or eight-cylinder variety. The engine block 12 defines two rows of parallel cylinders 13, each cylinder 13 having a cylinder access port 14 bored through the bottom of the engine block 12. The exhaust test stand 10 further has an altered engine head 15 disposed over the engine cylinder 13 in a normal fashion. The engine head 15 has a plurality of exhaust ports 16 over the cylinders 13 for coupling the manifold 17 of the exhaust system 18 to the test stand 10. Defined below each of the cylinder access ports 14 is a cylindrical input plenum 19. Each input plenum 19 has a burner assembly 20, which is coupled to a fuel source 21. Each cylinder 13 has a temperature sensor 22, which provides a first signal to a controller 23. The controller 23 adjusts the valve set 24, which is functionally disposed between the burner assembly 20 and the fuel source 21.

Each input plenum 19 is formed by first and second cylindrical plenum chambers 25 and 27. The first plenum chamber 25 has a first plenum chamber output port 26, which is coupled to the cylinder access port 14. The first plenum chamber 25 is coupled to the second plenum chamber 27 at its lower end. The burner assembly 20 is disposed within the second plenum chamber 27 and receives oxygen to complete combustion of the gas from the fuel source 21 through an opening defined in the bottom of the second chamber 27.

The valve set 24 has a pressure regulator 28 for regulating the pressure of the fuel from the fuel source 21 into the burner assemblies 20. The valve set also has a plurality of metering valves 29, which are individually adjustable via the controller 23 to adjust the amount of gas into the individual burners 20 in each input plenum 19. This allows the controller 23 to maintain a constant temperature within a given cylinder 13.

Optionally, disposed between each burner assembly 20 and the exhaust port 16 of the engine head 15 is a set of rotatable valves 30. The rotatable valves 30 are coupled to a shaft 31, which functions to rotate the valves 30 along a row of parallel cylinders 13. It is envisioned that these valves be rotated at between 500 and 5000 r.p.m. Optionally, the orientation of the valves 30 about the shaft 31 can be altered with respect to each other thus adjusting the flow of exhaust gasses through the system into the exhaust system to be tested. The Shaft 31 is coupled to a motor 32 that rotates the rotatable valves. The rotation of these valves adds rhythmic cycling to the exhaust system to better simulate the operating conditions of a real exhaust system without the need for the high-pressure gases of a regular engine.

The controller 23 of the current invention receives input signals from temperature sensors 22, which are preferably thermal couples, disposed within the engine block 12. The thermal couples can alternately be placed within the plenum first chamber, the cylinder, or the exhaust port 16 of the engine block. These thermal couples function to individually measure the temperatures of the exhaust gases, leaving each individual cylinder. These temperature signals are used by the controller 23 to individually adjust the valve set 24. The valve set 24 allows for the individual adjustment of the amount of fuel from the fuel source 21 to the burner assembly 20. The fuel assembly 21 is shown as bottled propane gas; however, natural gas is also suitable as a fuel for the system.

Figure 2:
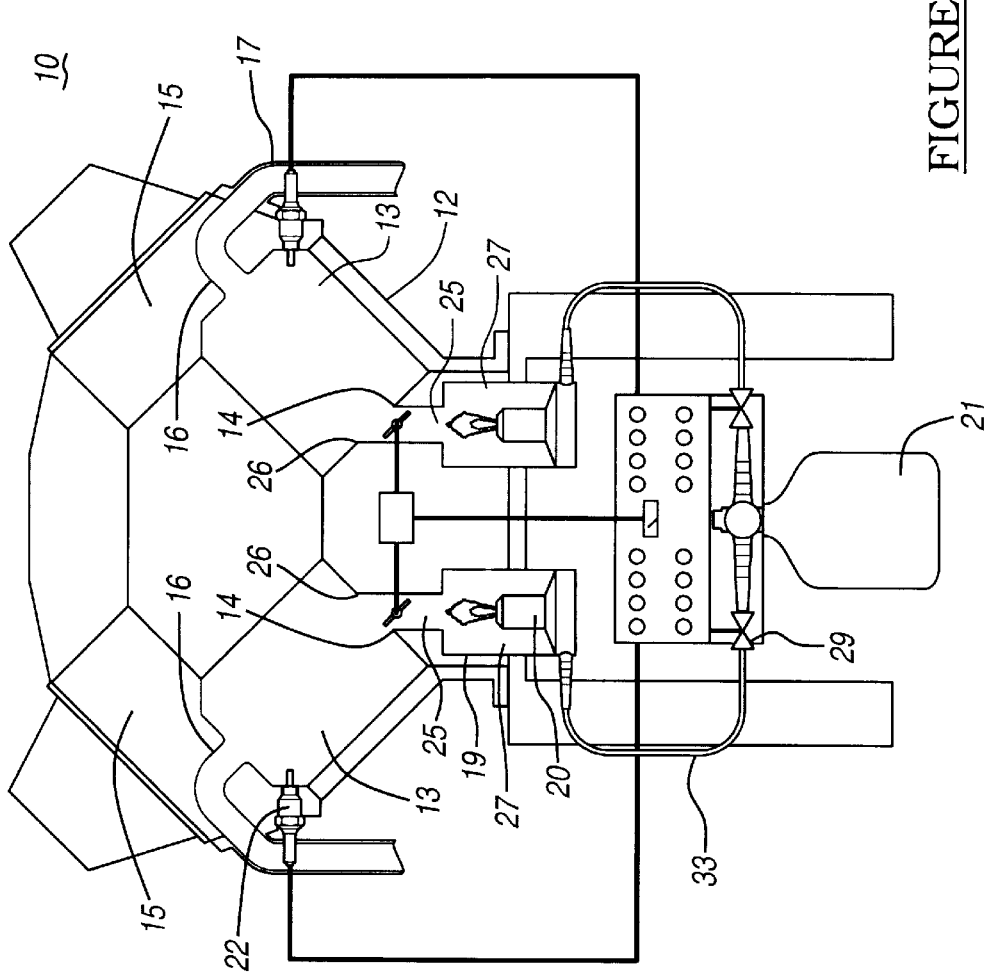
FIG. 2 is a cross-section of the exhaust system test stand as depicted in FIG. 1 showing the heating plenums and associated controller 23.

The controller 23 can also adjust the speed of the motor 32 rotating the shaft 31 for the optional rotatable valves 30. It is preferred that the rotatable valves 30 be disposed with in the first plenum chamber 25 as best can be seen in FIG. 2. Although not shown, each engine head 15 has a plurality of input ports. As the input ports of the engine head 15 typically are used to inject fuel into the internal combustion engine, they are not needed. As such, to better test the exhaust system 18, the input ports are typically welded closed.

Figure 3:
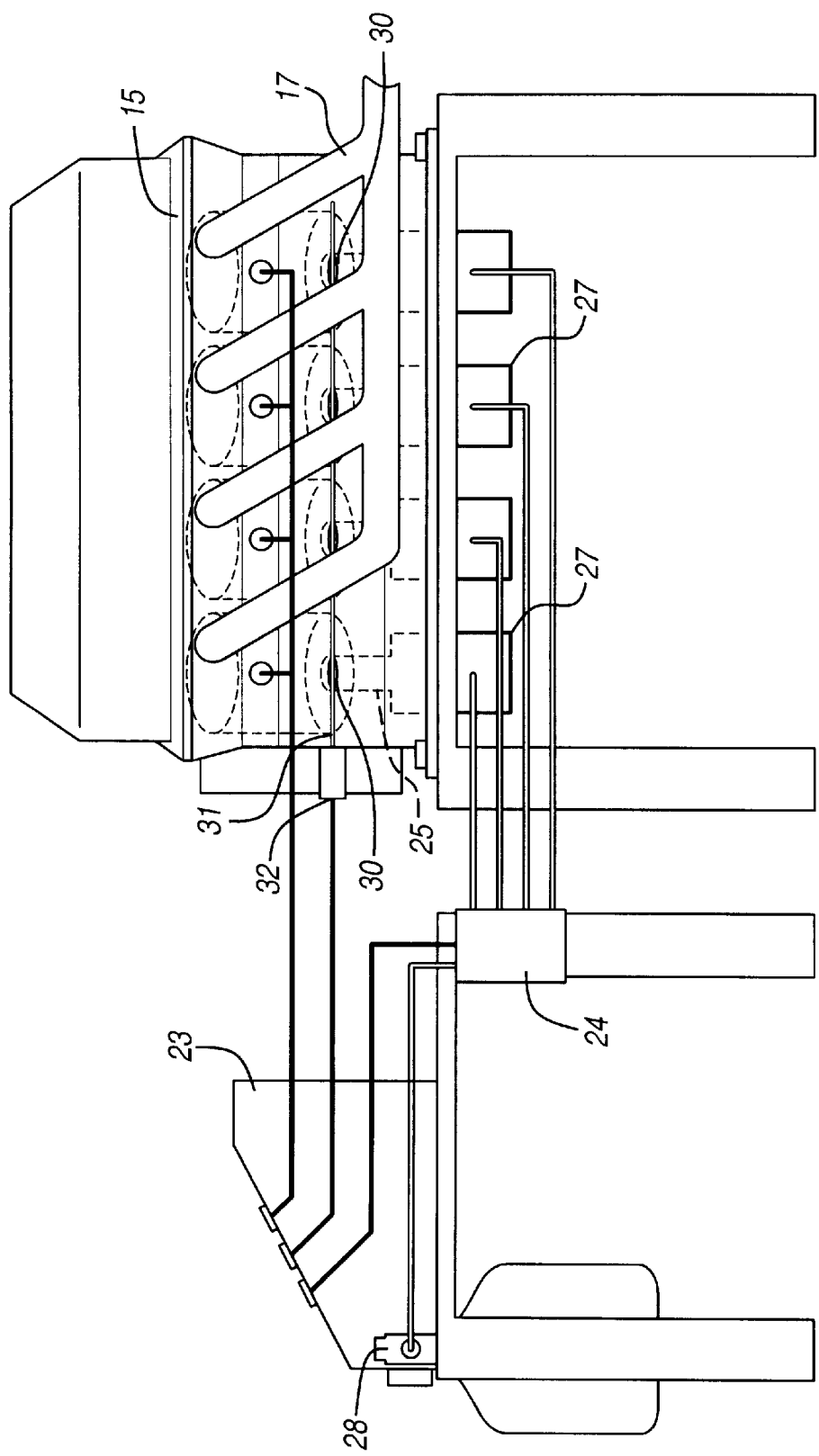
FIG. 3 is a side view of the test stand of the present invention showing the interconnection of the gas fuel lines through a metering arrangement as well as the interconnection of the sensing system.

As best seen in FIG. 3, each input plenum 19 has a fuel line 33 coupling the metering valves 29 to the burner assemblies 20. Disposed between the fuel source 21 and the metering valves 29 is a standard gas pressure regulator 28.

In operation, a test stand having an engine block with the appropriate number of engine cylinders is provided. The engine block 12 is modified, adding the plenum 19 and burner assemblies 20. The exhaust system 18 to be tested is coupled to the modified head 15 of the engine block 12. In operation, the controller 23 allows gas to flow to the burners assemblies 20, which are ignited manually or automatically. The controller 23 monitors the temperatures of the varying cylinders and adjusts the amount of fluid going to each one to maintain proper system temperature as well as exhaust gas flow.

The foregoing discussion discloses and describes a preferred embodiment of the present invention. One skilled in the art will readily recognize from such discussion, and from the accompanying drawings that various changes, modifications, and variations can be made therein without departing from the true spirit and fair scope of the invention.

What is claimed is:

1. An engine test stand comprising:

an engine block defining a plurality of cylinders, each cylinder defining a cylinder access port;

an exhaust port configured to fluidly couple an exhaust system to the plurality of cylinders;

a plurality of input plenums being fluidly coupled to the cylinder access ports, each input plenum having a burner assembly which is configured to input combustion gases into the cylinder;

a fuel source coupled to the burner assemblies;

a temperature sensor for measuring the temperature of the engine block, the temperature sensor configured to provide a first signal indicative of the temperature of the gases;

a valve set for adjusting the amount of fuel to each burner assembly; and a controller for adjusting the amount of fuel through the valve set based upon the first signal.

2. A testing apparatus of claim 1 wherein each input plenum defines a first chamber having an output port which is coupled to each cylinder access port.

3. The test stand of claim 2 wherein each input plenum further has a second chamber having a volume greater than the volume of the first chamber.

4. The test stand of claim 3 wherein one of the burner assemblies is disposed within the second chamber.

5. The test stand of claim 1 further having a plurality of rotatable valves disposed within the cylinder for affecting the flow of combustion gasses out of the cylinder.

6. The test stand of claim 5 further having a motor coupled to the rotatable valves.

7. The test stand of claim 6 wherein the controller is coupled to the motor and controls the speed of the motor.

8. The test stand of claim 7 wherein the motor is capable of rotating the rotatable valve elements at between 500 and 6000 rotations per minute.

9. The test stand of claim 7 wherein the motor is capable of rotating the rotatable valve element at between 1000 and 2000 rotations per minute.

10. The test stand of claim 1 wherein the valve set is capable of independently controlling the amount of fuel from the fuel source to each burner.

11. The test stand of claim 1 further having a flow rate sensor disposed between the valve set and a burner assembly.

12. The test stand of claim 1 further having a support structure for supporting the engine block.

* * * * *